(12) United States Patent
Knaappila

(10) Patent No.: US 9,668,209 B1
(45) Date of Patent: May 30, 2017

(54) LISTENING WINDOW ADJUSTMENTS FOR POWER SAVINGS IN BLUETOOTH LOW ENERGY (BLE) COMMUNICATIONS

(71) Applicant: Silicon Laboratories Finland Oy, Espoo (FI)

(72) Inventor: Jere M. Knaappila, Evitskog (FI)

(73) Assignee: Silicon Laboratories Finland OY

( * ) Notice: Subject to any disclaimer, the term of this patent is extended or adjusted under 35 U.S.C. 154(b) by 0 days.

(21) Appl. No.: 15/196,244

(22) Filed: Jun. 29, 2016

(51) Int. Cl.
*H04W 4/00* (2009.01)
*H04W 52/02* (2009.01)
*H04W 56/00* (2009.01)
*H04W 76/02* (2009.01)
*H04W 4/02* (2009.01)

(52) U.S. Cl.
CPC ....... *H04W 52/0209* (2013.01); *H04W 4/008* (2013.01); *H04W 4/023* (2013.01); *H04W 56/0065* (2013.01); *H04W 76/023* (2013.01)

(58) Field of Classification Search
CPC ..... H04W 4/008; H04W 4/023; H04W 8/005; H04W 24/10; H04W 52/0209; H04W 56/0065; H04W 76/02; H04W 76/023; H04W 84/18; H04L 27/2662
See application file for complete search history.

(56) References Cited

U.S. PATENT DOCUMENTS

| 2010/0265968 A1* | 10/2010 | Baldemair | H04L 27/2662 370/503 |
| 2011/0026578 A1 | 2/2011 | Chen et al. | |
| 2014/0086125 A1* | 3/2014 | Polo | H04W 52/0229 370/311 |
| 2014/0192649 A1* | 7/2014 | Bhooma | H04W 28/10 370/235 |
| 2014/0328210 A1 | 11/2014 | Knaappila | |
| 2015/0271628 A1 | 9/2015 | Knaappila | |
| 2016/0262204 A1* | 9/2016 | Sorrentino | H04W 76/023 |
| 2016/0269168 A1* | 9/2016 | Carstens | H04W 4/008 |
| 2016/0294713 A1* | 10/2016 | Hiremath | H04W 24/10 |

FOREIGN PATENT DOCUMENTS

| WO | WO2011/010181 A1 | 1/2011 |
| WO | WO2013/063789 A1 | 5/2013 |
| WO | WO2014/068366 A1 | 5/2014 |

OTHER PUBLICATIONS

Bluetooth, "Architecture & Terminology Overview", Covered Core Package Version 4.0, vol. 1, 140 pgs. (Jun. 2010).
Bluetooth, "Core System Package (Low Energy Controller Volume)", Covered Core Package Version 4.0, vol. 6, 138 pgs. (Jun. 2010).
Bluetooth, "Master Table of Contents & Compliance Requirements", Covered Core Package Version 4.0, vol. 0, 2302 pgs. (Jun. 2010).

* cited by examiner

*Primary Examiner* — Thanh Le
(74) *Attorney, Agent, or Firm* — Egan Peterman Enders Huston

(57) ABSTRACT

Systems and methods are disclosed for listening window adjustments for power savings in BLE (Bluetooth low energy) communications. BLE devices determine time differences between assumed transmission times and actual receive times for packets transmitted by another BLE device. The BLE device then adjusts a listening window using the time differences, for example, to reduce the size of the listening window based upon the time differences. The adjusted listening window is then used by the BLE device to listen for and receive additional packets from the other BLE device.

26 Claims, 6 Drawing Sheets

LISTENING WINDOW ADJUSTMENTS FOR POWER SAVINGS IN BLUETOOTH LOW ENERGY (BLE) COMMUNICATIONS

TECHNICAL FIELD

The present application relates to Bluetooth modules and more particularly to Bluetooth low energy (BLE) communications.

BACKGROUND

The Bluetooth Low Energy (BLE) standard is a specification for a Bluetooth wireless radio technology. The BLE standard has been designed for low-power and low latency applications for wireless devices within short range wireless communications. BLE devices can be found in a wide range of industries including healthcare, fitness, security, smart energy, industrial automation, and home entertainment. Further, BLE technology is increasingly being used in new applications and environments. As compared to classic Bluetooth devices, BLE devices consume significantly less power for communications and are able to initiate data transmission much more quickly than classic Bluetooth devices. Due to these power savings and quick connections, BLE devices often remain in a non-sleep, powered condition and are communicating intermittently with other BLE devices. However, even with the power saved by BLE devices, battery life remains a significant issue in most environments for BLE devices.

SUMMARY

Systems and methods are disclosed for listening window adjustments for power savings in BLE (Bluetooth low energy) communications. For the embodiments described herein, a BLE device determines a time difference between an assumed transmission time and an actual receive time for a packet transmitted by another BLE device. The BLE device then adjusts a listening window using the time difference, for example, to reduce the size of the listening window based upon the time difference. The adjusted listening window is then used by the BLE device to listen for and receive additional packets from the other BLE device. Other features and variations can be implemented, if desired, and related systems and methods can be utilized, as well.

For one embodiment, a method for BLE (Bluetooth Low Energy) packet communications includes communicating packets between a first BLE device and a second BLE device using a defined time interval between packet communications, listening at the first BLE (Bluetooth Low Energy) device within a listening window for a packet transmitted from the second BLE device, receiving within the listening window a packet at the first BLE device transmitted from the second BLE device, determining a time difference between an assumed transmission time for the packet based upon the defined time interval and an actual receive time for the packet, adjusting the listening window for first BLE device using the time difference, and operating the first BLE device to listen within the adjusted listening window for one or more additional packets transmitted from the second BLE device.

In additional embodiments, the adjusting reduces a size for the listening window based upon the time difference. In further embodiments, the listening window includes a clock drift component, and the adjusting removes the clock drift component to reduce the size for the listening window.

In additional embodiments, the communicating occurs within a connection event between the first BLE device and the second BLE device, and a defined Inter Frame Space (T_IFS) between packet communications for the connection event represents the defined time interval. In further embodiments, the listening window further includes a base component configured to account for the defined T_IFS and allowed deviation in the T_IFS.

In additional embodiments, the communicating occurs between multiple connection events between the first BLE device and the second BLE device, and a connection interval between connection events represents the defined time interval. In further embodiments, the listening window further includes a base component configured to account for the defined connection interval and allowed deviation in the connection interval.

In additional embodiments, the method also includes determining a plurality of time differences for a plurality of received packets and then adjusting the listening window based upon the plurality of time differences. In further embodiments, the method also includes generating an average for the plurality of time differences and using the average to adjust the listening window. In still further embodiments, the adjusting reduces a size for the listening window based upon the plurality of time differences.

In additional embodiments, the method also includes determining a distance between the first BLE device and the second BLE device and adjusting the listening window based upon the distance. In further embodiments, the method also includes determining that the distance exceeds a predetermine threshold before adjusting the listening window based upon the distance. In still further embodiments, the method also includes determining the distance between the first BLE device and the second BLE device using the time difference.

For one embodiment, a BLE (Bluetooth Low Energy) device includes a network interface circuitry including a radio configured to transmit and receive packet communications and one or more processors configured to execute instructions stored in a non-transitory computer readable medium that cause the one or more processors to communicate packets with another BLE device through the network interface circuitry using a defined time interval between packet communications, listen within a listening window for a packet transmitted from the other BLE device, receive within the listening window a packet from the other BLE device, determine a time difference between an assumed transmission time for the packet based upon the defined time interval and an actual receive time for the packet, adjust the listening window using the time difference, and listen within the adjusted listening window for one or more additional packets transmitted from the other BLE device.

In additional embodiments, the adjustment is configured to reduce a size for the listening window based upon the time difference. In further embodiments, the listening window includes a clock drift component, and the adjustment is configured to remove the clock drift component to reduce the size for the listening window.

In additional embodiments, the defined time interval is a defined Inter Frame Space (T_IFS) between packet communications within a connection event with the other BLE device. In further embodiments, the listening window further includes a base component configured to account for the defined T_IFS and allowed deviation in the T_IFS.

In additional embodiments, the defined time interval is a connection interval between connection events with respect to the other BLE device. In further embodiments, the listening window further includes a base component configured to account for the defined connection interval and allowed deviation in the connection interval.

In additional embodiments, the one or more processors are further configured to determine a plurality of time differences for a plurality of received packets and then adjust the listening window based upon the plurality of time differences. In further embodiments, the one or more processors are further configured to generate an average for the plurality of time differences and use the average to adjust the listening window. In still further embodiments, the adjustment is configured to reduce a size for the listening window based upon the plurality of time differences.

In additional embodiments, the one or more processors are further configured to determine a distance to the other BLE device and adjust the listening window based upon the distance. In further embodiments, the one or more processors is further configured to determine that the distance exceeds a predetermine threshold before adjustments are made to the listening window based upon the distance. In still further embodiments, the one or more processors are further configured to determine the distance to the other BLE device using the time difference.

Different or additional features, variations, and embodiments can be implemented, if desired, and related systems and methods can be utilized, as well.

DESCRIPTION OF THE DRAWINGS

It is noted that the appended drawings illustrate only example embodiments and are, therefore, not to be considered limiting of their scope, for the illustrated embodiments may admit to other equally effective embodiments.

DETAILED DESCRIPTION

Systems and methods are disclosed for listening window adjustments for power savings in BLE (Bluetooth low energy) communications. For the embodiments described herein, a BLE device determines a time difference between an assumed transmission time and an actual receive time for a packet transmitted by another BLE device. The BLE device then adjusts a listening window using the time difference, for example, to reduce the size of the listening window based upon the time difference. The adjusted listening window is then used by the BLE device to listen for and receive additional packets from the other BLE device. Different features and variations can be implemented, as desired, and related systems and methods can be utilized, as well.

Figure 1:
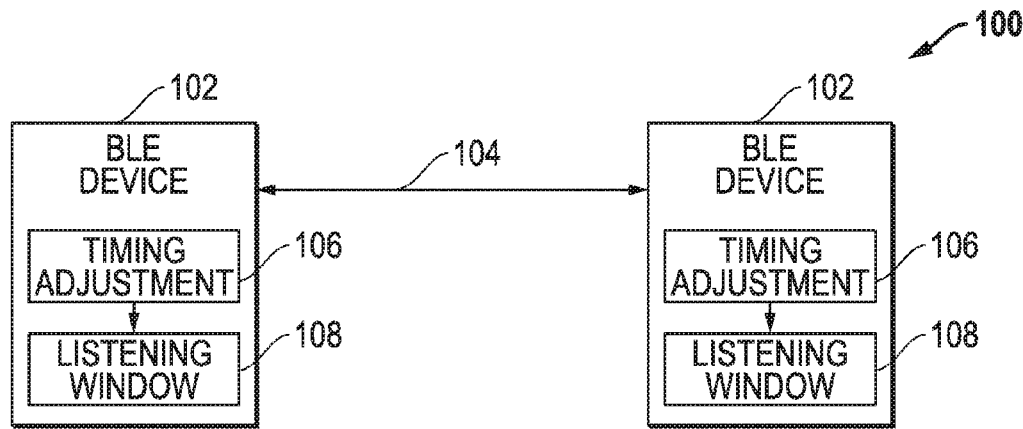
FIG. 1 is a block diagram of an example embodiment for two BLE (Bluetooth low energy) devices communicating through a wireless communication connection.

FIG. 1 is a block diagram of an example embodiment 100 for two BLE devices 102 communicating through a wireless communication connection 104. Each of the BLE devices 102 uses a listening window 108 to listen for and detect packets communicated by the other BLE device. For the embodiments described herein, a timing adjustment 106 is applied to the timing window 108 to adjust the timing window 108, for example, to reduce its size. By reducing the size of the timing window 108, power is saved by the BLE devices 102. For example, as described further below, time differences between assumed transmission times for packets and actual arrival times for packets can be used to adjust the timing window 108. As also described further below, timing delay detected with respect to long range communications between BLE devices can also be used to adjust the timing window 108. Other variations could also be implemented while still taking advantage of the listening window adjustment techniques described herein.

Figure 2:
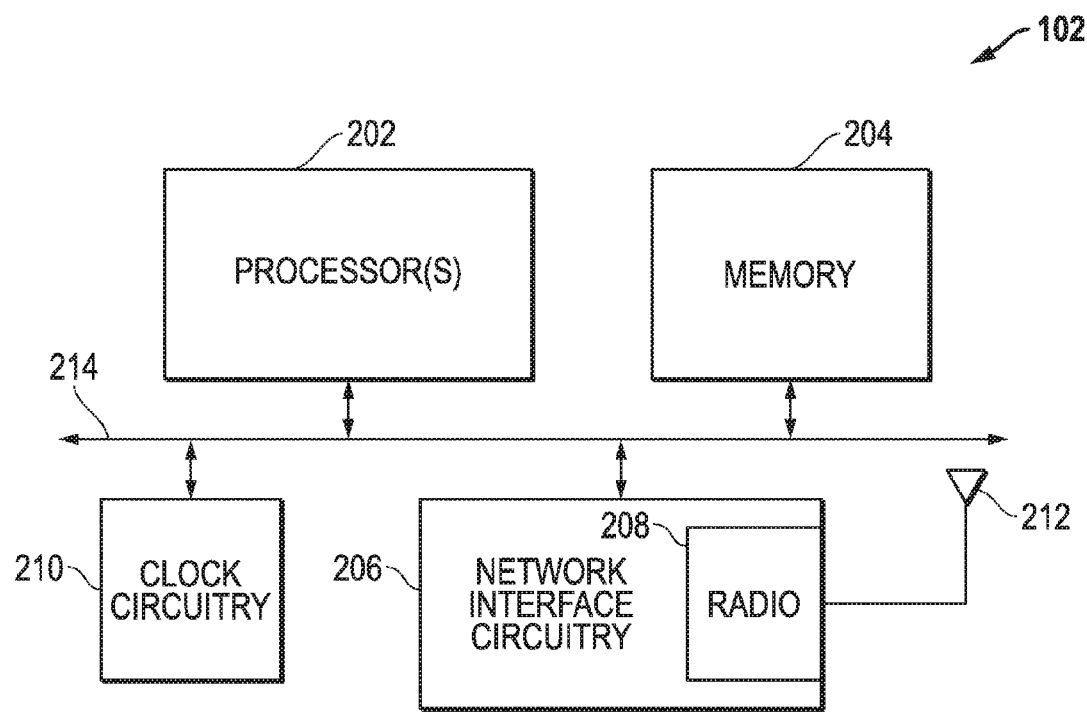
FIG. 2 is a block diagram of an example embodiment for a BLE device.

FIG. 2 is a block diagram of an example embodiment for a BLE device 102. The BLE device 102 for this example embodiment includes one or more processors 202, memory 204, clock circuitry 210, and network interface circuitry 206 coupled to each other through a system bus interconnect 214. In certain embodiments, the memory 204 stores instructions which, when executed by the processors 202, cause the BLE device 204 to perform the functions described herein. This memory 204 can be implemented, for example, using one or more non-volatile memories (e.g., FLASH read-only-memories (ROMs), electrically programmable ROM (EPROMs), and/or other non-volatile memory devices) and/or one or more volatile memories (e.g., dynamic random access memories (DRAMs) and/or other volatile memory devices). The network interface circuitry 205 is a wireless interface coupled to an antenna 212, and the network interface circuitry 206 can include a wireless radio 208 that transmits and receives packet communications to and from other BLE devices through antenna 212, baseband processing, MAC (media access control) level processing, and/or other physical layer processing for BLE packet communications. The processors 202 and the network interface circuitry 206 can also read and write from the memory 204 during operations, for example, to store packet information being received from or transmitted to another BLE device. The BLE device 102 also includes clock circuitry 210, for example, that can be used by the processors 202 and/or the network interface circuitry 206 to generate timestamps. Such timestamps can be used to indicate arrival times for received packets, to indicate departure times for transmitted packets, and/or for other timing purposes. Although not shown, the BLE device 102 also includes a power supply, which may be a battery or a connection to a permanent power source such as a wall outlet. Further, it is noted that the system bus interconnect 214 can include one or more electrical buses and/or intervening circuitry that provides electrical communications. Other variations could also be implemented.

It is further noted that BLE 102 including the one or more processors 202, the clock circuitry 210, and/or the network interface circuitry 206 can be implemented using one or more electronic circuits (e.g., central processing units (CPUs), controllers, microcontrollers, microprocessors, hardware accelerators, FPGAs (field programmable gate arrays), ASICs (application specific integrated circuits), and/ or other programmable processing circuitry) that are programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer readable mediums (e.g., example, data storage devices, flash memories, random access memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

Figure 3:
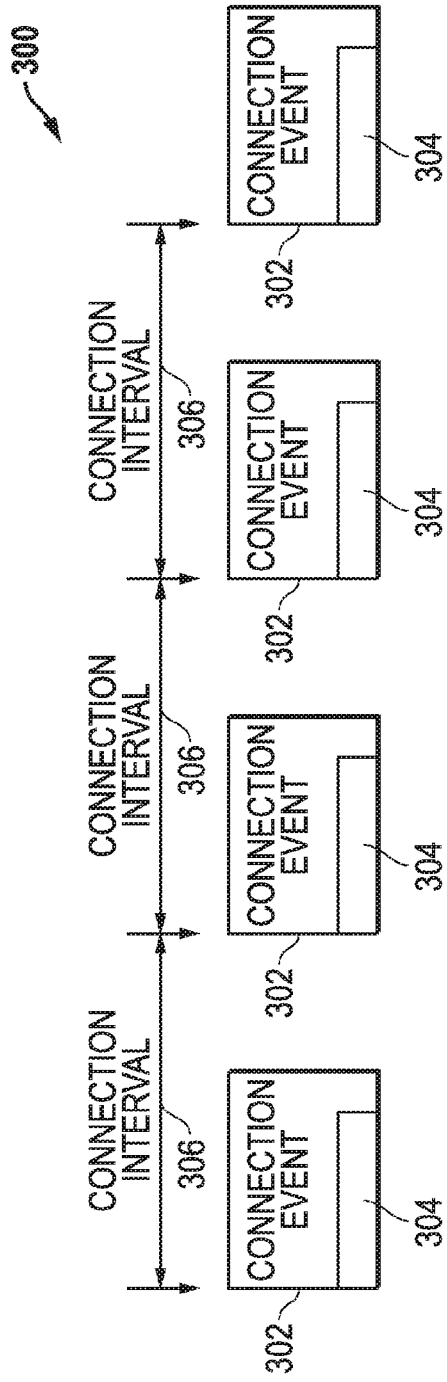
FIG. 3 is a diagram of an example embodiment for connection events between two BLE devices according to the BLE standard.

FIG. 3 is a diagram of an example embodiment 300 for connection events 302 between two BLE devices according to the BLE standard. As depicted, a connection interval 306 is provided between each connection event 302. In addition, each connection event 302 includes a series of packets 304 transmitted between the two BLE devices. For these communications, one BLE device will typically operate as the master device, and one BLE device will typically operate as the slave device. The connection interval 306 for BLE communications can be a fixed interval of multiples of 1.25 ms (milliseconds) in the range of 7.5 ms to 4 seconds (e.g., 6-times 1.25 ms up to 3200 times 1.25 ms). The maximum allowed deviation for each connection event 302 is ±2 μs microseconds.

It is noted that the clock circuitry 210 for BLE devices 102 typically includes two clocks. One clock is a high accuracy clock with accuracy better than ±50 ppm (parts per million). This high accuracy clock is typically used for timekeeping within a particular connection event 302. The second clock is a sleep clock with accuracy better than ±500 ppm. This sleep clock is typically used for timekeeping between connection events 302 during the remaining portion of the connection interval 306. Because of potential inaccuracies of these clocks, a listening window 108 is used around the assumed transmission time for packets as described further below with respect to FIG. 5.

Figure 4:
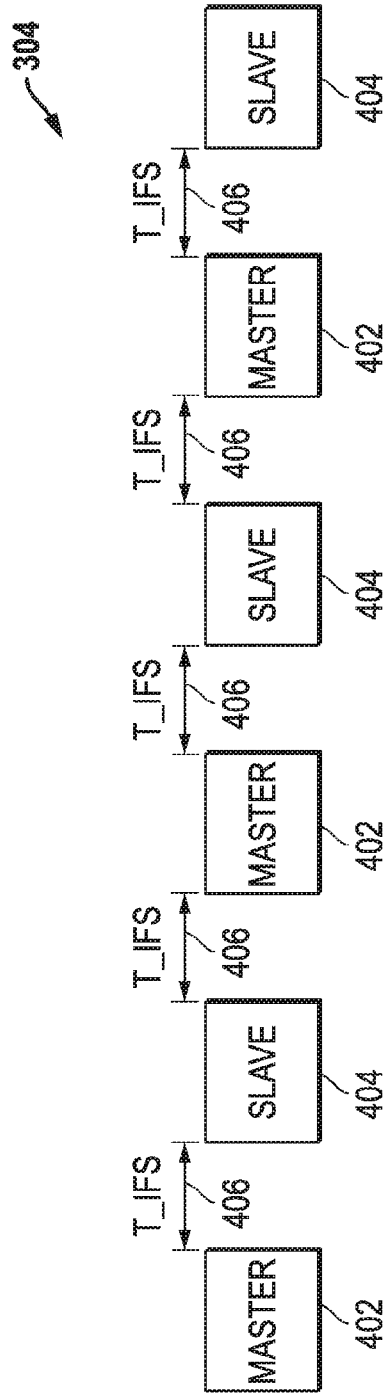
FIG. 4 is a diagram of an example embodiment for packets communicated between master and slave BLE devices during a connection event.

FIG. 4 is a diagram of an example embodiment for packets communicated between master and slave BLE devices during a connection event 304. As depicted, the master and slave devices alternate transmitting packets such that each master packet 402 transmitted by the master BLE device is followed by a slave packet 404 transmitted by the slave BLE device. The BLE standard also requires that a fixed time interval 406 occur between each packet transmission. This time interval 406 between two consecutive packets is called the Inter Frame Space (T_IFS), and T_IFS is typically set to 150 μs for BLE communications with an allowed deviation of only ±2 μs. As described further below, this requirement effectively prevents standards compliant communications for distances between BLE devices of over 300 meters because the signal travel time between two devices at 300 meters is about 2 p s roundtrip (e.g., 1 μs in each direction). As described below with respect to FIG. 9, however, adjustments can also be made to the listening window to account for such long distance communications.

According to the BLE standard, one or more slave devices can be connected to a master BLE device, and the master BLE device is able to communicate concurrently with one or more slave devices. To let the BLE master device know about the slave BLE devices, the slave BLE devices (e.g., at that point "advertisers" according to the BLE standard) periodically, at pseudo-random intervals, pass advertisement packets while a scanner BLE device (e.g., at that point a "scanner" according to the BLE standard) is scanning Once connected, a scanner BLE device operates as the master device, and an advertiser BLE device operates as the one or more slave devices connected to the master device.

Advertisement packet types from the BLE devices operating as advertisers include the following packet types:
ADV_IND for a connectable undirected advertising event,
ADV_DIRECT_IND for a connectable directed advertising event,
ADV_NONCONN-IND for a non-connectable undirected advertising event, and
ADV_DISCOVER_IND for a discoverable undirected advertising event.

Response packets from the scanner BLE device with respect to the advertisement packets received from an advertiser BLE device include the following packet types:
SCAN_REQ for a scan request for further information from the advertiser, and
CONNECT_REQ for a connect request.

When an advertiser BLE device receives a SCAN_REQ from a scanning device, the advertising device may give more information to the scanner BLE device by sending back a SCAN_RSP packet. This SCAN_RSP packet may contain additional information about the advertiser BLE device, such as for example, the name of the advertising device, the services provided by the advertising device, and/or other information about the device.

The CONNECT_REQ packet from the scanner BLE device contains data that defines the transmit window size for the connection, the timing window for first data packet, the transmit window offset that is off when the transmit window starts, the connection interval that will be used between connection events, a slave latency that defines a number of times the slave can ignore connection events from the master, a connection timeout that provides the maximum time between two correctly received packets in the connection event before the link is considered to be lost, the hop sequence that provides a random number determining the starting point for a hop, a channel map, and a CRC (cyclic redundancy check) initialization value.

According to the BLE standard, the operational state when advertisement packets are communicated between BLE scanner/advertiser devices is called the "advertising state," and the operational state once a connection has been is called "connected state." In both states, packet data transfers occur between the BLE devices.

It is noted that the BLE devices can be a wide variety of electronic devices that are configured to operate according to the BLE standard. In addition, a BLE device can be implemented to operate as both a slave device and a master device, as a slave only device, or as a master only device. Slave BLE devices are typically implemented as sensors and/or detectors that function to gather information or data. Such a sensor/detector slave BLE device may be, for example, a sensor actuator (e.g., temperature sensor actuator), a heart rate sensor, a light bulb, a proximity sensor, and/or another electronic device. Master BLE devices are typically implemented as host processing devices that receive, process, and use the information or data collected by slave BLE devices and that can also send information or data to the slave BLE devices for use by the BLE devices to perform their operational functions. A master BLE device may be, for example, a mobile phone, a smart phone, a personal digital assistant, a personal computer, a laptop computer, a tablet computer, and/or another electronic device.

Figure 5:
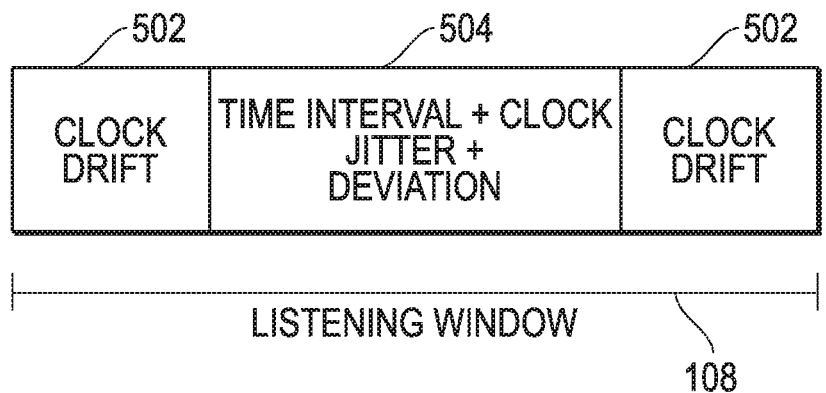
FIG. 5 is a diagram of an example embodiment a listening window for BLE packet communications between BLE devices.

FIG. 5 is a diagram of an example embodiment for a listening window 108 for BLE packet communications between BLE devices. A listening window size for the listening window 108 can be based upon the master clock accuracy, the slave clock accuracy, the time since the last packet transmission, the maximum deviation allowed for the time interval between packet transmissions (e.g., connection interval and/or T_IFS), and/or other desired components. For example, the listening window size can be determined using the following equation in one embodiment:

Listening window size=[(master clock accuracy+ slave clock accuracy)*(time since last transmission)]+maximum allowed deviation As one example using this equation, if the master clock accuracy is 50 ppm, the slave clock accuracy is 50 ppm, the time since the last connection event is 120 ms, and the maximum allowed deviation is ±2 μs (i.e., 4 μs total possible deviation), then the listening window size would be 16 μs (i.e., size=[(0.000050+0.000050)*(120,000 μs)]+4 μs=16 μs).

As recognized for the current embodiments, the listening window 108 includes clock drift components 502 to account for clock drift associated with the master and slave clocks. The listening window 108 also includes a base component 504 to account for the time interval, such as the connection interval 306 or T_IFS 406 defined for the BLE packet communications, clock jitter associated with the master and slave clocks, and/or the maximum allowed deviation in the time interval (e.g., ±2 μs). The clock drift components 502 represent long-term errors, and the base component 504 includes short-term errors such as those caused by the clock jitter for the BLE devices.

According to the BLE standard, the slave BLE device operates to synchronize its time to the actual receive time of the packets received from the master BLE device. Further, according to the BLE standard, the master BLE device transmits the first packet of each connection event 302 at a fixed connection interval 306.

Figure 6:
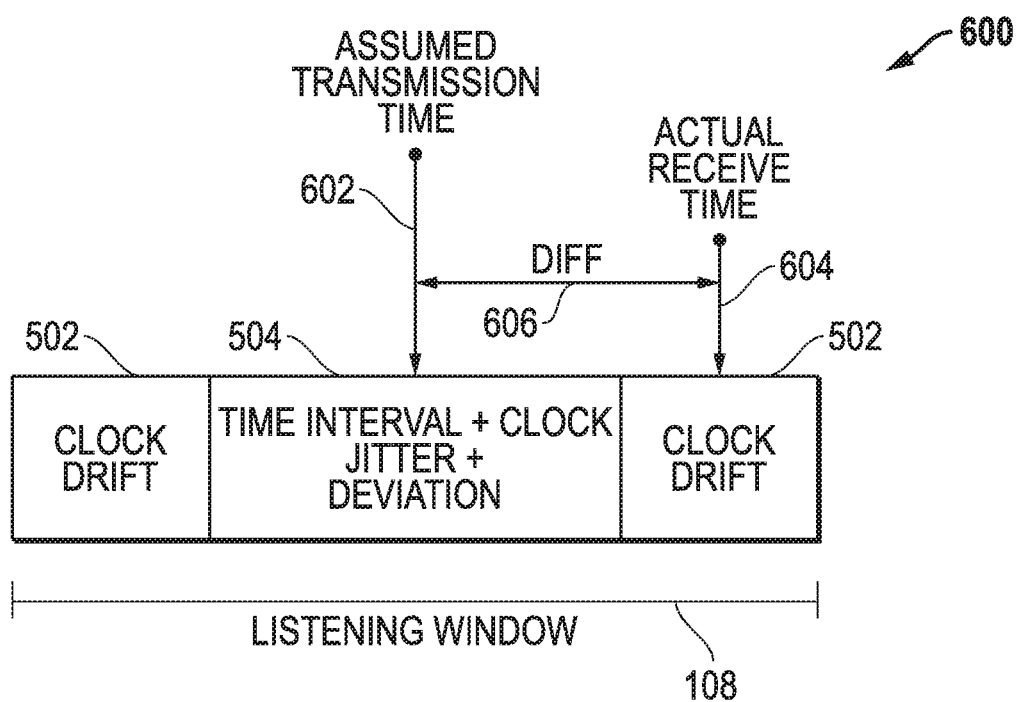
FIG. 6 is a diagram of an example embodiment for detection of a time difference that is used to adjust the listening window.

FIG. 6 is a diagram of an example embodiment 600 for detection of a time difference 606 that is used to adjust the listening window 108. In particular, the receiving BLE device determines the time difference (DIFF) 606 between the assumed transmission time 602 for an incoming packet, which is based upon the time interval (e.g., connection interval 306, T_IFS 406, and/or other time interval) and the time associated with the last transmitted packet, and the actual receive time 604 for the incoming packet. As described further below, this time difference 606 can be used to adjust the size of the listening window 108. It is further noted that the receiving BLE device can be a slave BLE device or a master BLE device.

Figure 7:
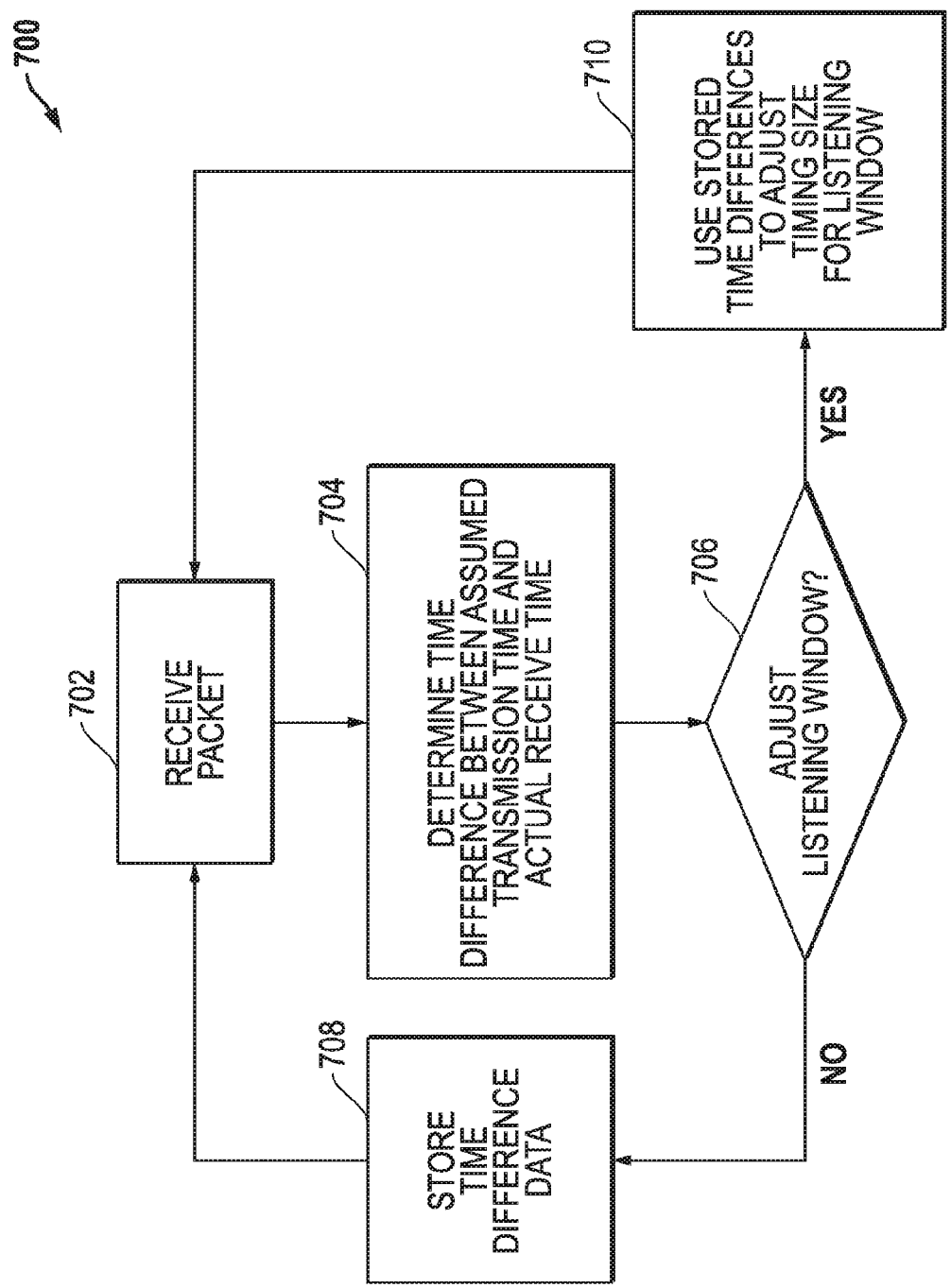
FIG. 7 is a process flow diagram of an example embodiment that uses the time difference to adjust the listening window.

FIG. 7 is a process flow diagram of an example embodiment 700 that uses the time difference 606 to adjust the listening window 108. In block 702, a packet is received by a BLE device 102. In block 704, the time difference 606 is determined between the assumed transmission time 602 and the actual receive time 604. In block 706, a determination is made whether to adjust the listening window. If "NO," then flow passes to block 708 where data representing the time difference is stored, for example, in memory 204. If "YES," then flow passes to block 710 where the stored time differences are used to adjust the timing size for the listening window 108. For example, the time differences can be averaged, and the average time difference can be used to adjust the listening window. In addition, if packets are repeatedly received at the same time difference from the assumed transmission times, this time difference can be used as a time offset to predict more accurately the receive time of the next packet from the other BLE device. Still further, other statistical analyses (e.g., standard deviation, median, etc.) can also be applied to the time differences to determine a time difference value to apply. In operation, this time difference value and/or time offset can be used to remove consistent long-term errors due to clock drift from the listening window 108 thereby reducing the size of the listening window 108. This reduction in size allows for the BLE device 102 to save power as its active listening time is reduced.

Figure 8:
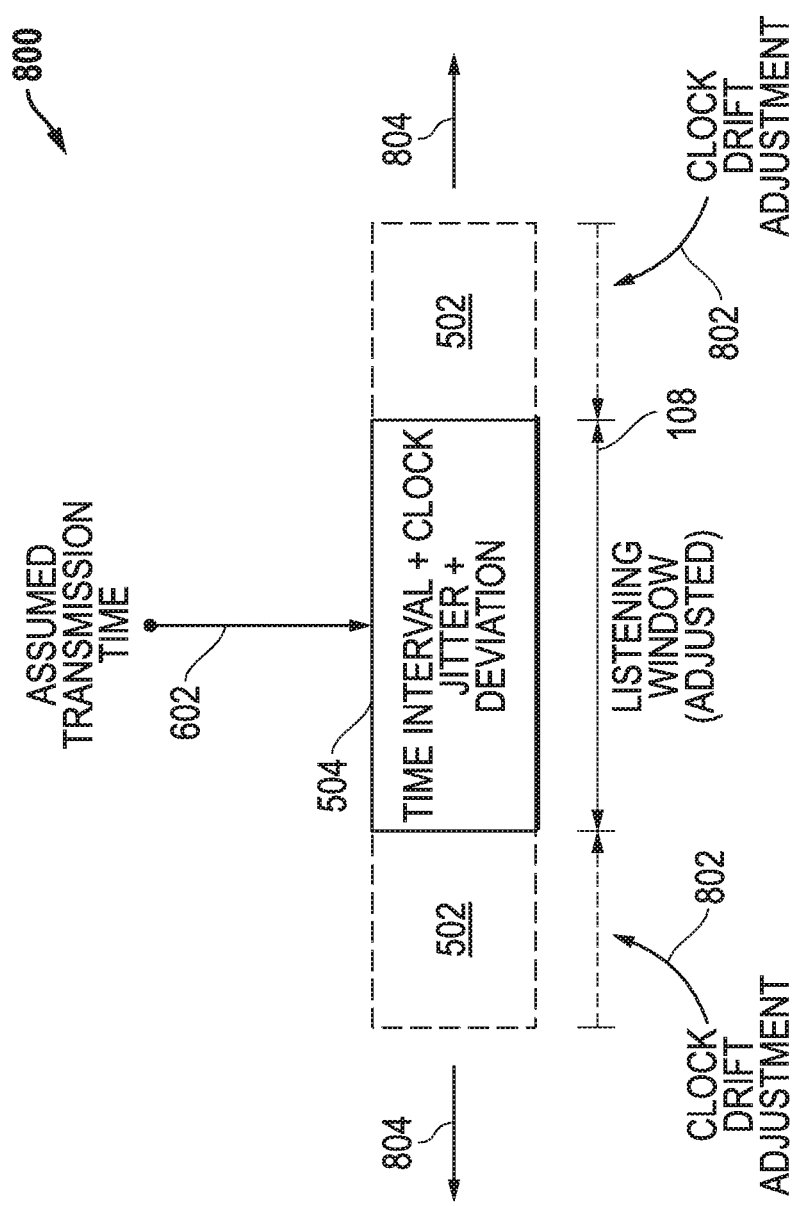
FIG. 8 is a diagram of an example embodiment where clock drift adjustments based upon one or more time differences have been used to adjust the listening window.

FIG. 8 is a diagram of an example embodiment 800 where clock drift adjustments 802 based upon one or more time differences 606 have been used to adjust the listening window 108. For this embodiment 800, consistent errors in time differences 606 measured and stored by the receiving BLE device are used to represent a clock drift associated with the BLE devices. This clock drift is used to shift the listening window 108 with respect to the assumed transmission time as represented by arrows 804. As such, the listening window 108 is better centered with respect to the timing for the incoming packet. In addition, because the clock drift has been accounted for using the time differences 606, clock drift adjustments 802 can be made to reduce the size of the listening window 108. Because the long-term clock drift has been accounted for, the adjusted listening window 108 no longer is required to be large enough to cover the potential clock drift components 502. Rather, the adjusted listening window 108 is narrowed to cover the base component 504 and not to cover the clock drift components 502. This reduction in the size of the listening window 108 provides significant potential power savings as the receiving BLE device can limit the time within which it is actively listening for a transmit packet from the transmitting BLE device.

In prior solutions, it is noted that the listening window 108 would need to be a large enough to compensate for clock drift components 502 as well as the base component 504. In contrast, for the embodiments described herein, the receiving BLE device detects the time difference 606 between the assumed transmission time 602 for a received packet and the actual receive time 604 for the packet. One or more of these differences 606 are then used to determine clock drift for the BLE devices. This known clock drift is then used to narrow the listening window 108 so that it only accounts for base component 504 that includes short-term errors from clock jitter for the BLE devices. As such, the receiving BLE device is able to save power because the timing size of the adjusted listening 108 has been shortened as compared to prior solutions where the timing window 108 also accounts for the clock drift components 502.

In addition to using time difference measurements to narrow the timing window 108, the time difference information can also be used to adjust for delays associated with the distance between BLE devices. Every 150 meters distance between BLE devices will add about 1 μs to signal delay. This delay can lead to inefficient listening by a receiving BLE device before it is even possible for the BLE device to receive a transmitted packet due to this distance delay. Further, these distance delays can cause connection problems if devices are over 300 meters apart as the signal delay will cause the transmit time to exceed the allowed time for communication, such as the time limit for T_IFS 406 specified by the BLE standard (e.g., 7.5 ms to 4 seconds ±2 μs) or the time limit for T_IFS 406 specified by the BLE standard (e.g., 150±2 μs). As described herein, an adjustment can then be made to the listening window 108 to account for long distance delays.

Figure 9:
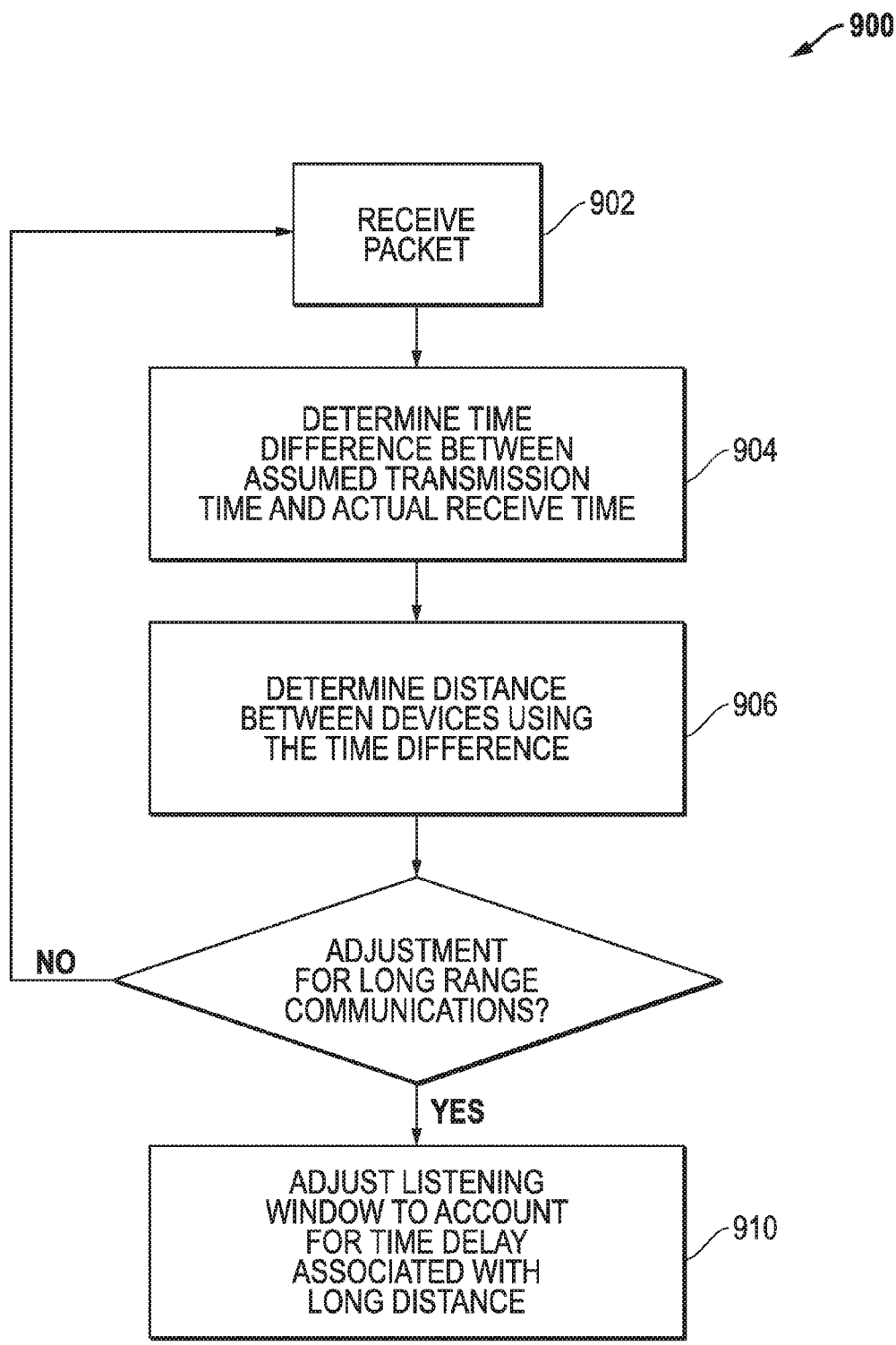
FIG. 9 is a process flow diagram of an example embodiment to adjust a listening window based upon long distance determinations.

FIG. 9 is a process flow diagram of an example embodiment 900 to adjust a listening window 108 based upon long distance determinations. In block 902, a packet is received from another BLE device. In block 904, a determination is made for the time difference 606 between the assumed transmission time 602 and the actual receive time 604 for the received packet. In block 906, the distance between the two BLE devices is determined using the time difference 606. In block 908, a determination is made whether or not to make an adjustment for long range communications. For example, if the distance between the two BLE devices exceeds a predetermined threshold distance (e.g., 300 meters), then an adjustment can be made to the listening window 108 to account for the additional delay due to the long distance. If "NO," then flow passes back to block 902. If "YES," then flow passes to block 910 where the listening window 108 is adjusted based upon the distance between the BLE devices. For example, the listening window 108 can be widened to account for the additional delay due to long distance communications.

As one example embodiment, it is assumed at the current receiving BLE device that a remote transmitting BLE device is known to communicate packets at a T_IFS value of 150 μs from the last packet it received. However, the actual receive time 604 for the incoming packet to the receiving BLE device is 0.4 μs late. The receiving BLE device can determine the distance to the remote transmitting BLE device by multiplying the delay time by the speed of light and dividing by two to account for both the back-and-forth travel times (e.g., (Delay Time)*(Speed of Light)/2=Distance). For this example, therefore, the distance to the remote transmitting device is 60 meters (e.g., $(0.4 \times 10^{-6})*(3.0 \times 10^{8})/2=60$). When this detected distance rises above a predetermined threshold distance (e.g., 300 meters), an adjustment is made to the listening window 108 to account for the distance delay.

In addition, to detecting a long distance using the time difference 606 between the assumed transmission time 602 and the actual receive time 604, a long distance can also be detected using other techniques. For example, long range communication can be detected where the times for received packets occasionally peek longer than the allowed deviation for the time interval (e.g., ±2 μs). For example, if no packet was received in last connection event, it can be assumed that a packet was sent outside the allowed times. Further, remote transmission power and local received signal strength (RSS) can also be used to calculate approximate distance. Where a long distance is detected, an associated compensation time (Tcomp) can be determined by diving the distance by the speed of light and multiplying by two to account for back-and-forth travel times (e.g., Tcomp=2(distance)/(speed of light)). For example, where two BLE devices are 300 meters apart, the compensation time is 2 (e.g., $Tcomp=2(300)/(3.0 \times 10^{8})=2$ μs). The listening window 108 can then be widened by this compensation time (Tcomp) to account for the potential delay due to the long distance communications.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the inventions are described herein with reference to specific embodiments, various modifications and changes can be made without departing from the scope of the present inventions. Accordingly, the specification and figures are to be regarded in an illustrative rather than a restrictive sense, and such modifications are intended to be included within the scope of the present inventions. Further, any benefits, advantages, or solutions to problems that are described herein with regard to specific embodiments are not intended to be construed as a critical, required, or essential feature or element of any or all the claims.

What is claimed is:

1. A method for BLE (Bluetooth Low Energy) packet communications, comprising:
  communicating packets between a first BLE device and a second BLE device using a defined time interval between packet communications;
  listening at the first BLE (Bluetooth Low Energy) device within a listening window for a packet transmitted from the second BLE device;
  receiving within the listening window a packet at the first BLE device transmitted from the second BLE device;
  determining a time difference between an assumed transmission time for the packet based upon the defined time interval and an actual receive time for the packet;
  adjusting the listening window for first BLE device using the time difference; and
  operating the first BLE device to listen within the adjusted listening window for one or more additional packets transmitted from the second BLE device.

2. The method of claim 1, wherein the adjusting reduces a size for the listening window based upon the time difference.

3. The method of claim 1, wherein the listening window comprises a clock drift component, and wherein the adjusting removes the clock drift component to reduce the size for the listening window.

4. The method of claim 1, wherein the communicating occurs within a connection event between the first BLE device and the second BLE device, and wherein a defined Inter Frame Space (T_IFS) between packet communications for the connection event represents the defined time interval.

5. The method of claim 4, wherein the listening window further comprises a base component configured to account for the defined T_IFS and allowed deviation in the T_IFS.

6. The method of claim 1, wherein the communicating occurs between multiple connection events between the first BLE device and the second BLE device, and wherein a connection interval between connection events represents the defined time interval.

7. The method of claim 6, wherein the listening window further comprises a base component configured to account for the defined connection interval and allowed deviation in the connection interval.

8. The method of claim 1, further comprising determining a plurality of time differences for a plurality of received packets and then adjusting the listening window based upon the plurality of time differences.

9. The method of claim 8, further comprising generating an average for the plurality of time differences and using the average to adjust the listening window.

10. The method of claim 8, wherein the adjusting reduces a size for the listening window based upon the plurality of time differences.

11. The method of claim 1, further comprising determining a distance between the first BLE device and the second BLE device and adjusting the listening window based upon the distance.

12. The method of claim 11, further comprising determining that the distance exceeds a predetermine threshold before adjusting the listening window based upon the distance.

13. The method of claim 11, further comprising determining the distance between the first BLE device and the second BLE device using the time difference.

14. A BLE (Bluetooth Low Energy) device, comprising:
network interface circuitry including a radio configured to transmit and receive packet communications; and
one or more processors configured to execute instructions stored in a non-transitory computer readable medium that cause the one or more processors to:
communicate packets with another BLE device through the network interface circuitry using a defined time interval between packet communications;
listen within a listening window for a packet transmitted from the other BLE device;
receive within the listening window a packet from the other BLE device;
determine a time difference between an assumed transmission time for the packet based upon the defined time interval and an actual receive time for the packet;
adjust the listening window using the time difference; and
listen within the adjusted listening window for one or more additional packets transmitted from the other BLE device.

15. The BLE device of claim 14, wherein the adjustment is configured to reduce a size for the listening window based upon the time difference.

16. The BLE device of claim 14, wherein the listening window comprises a clock drift component, and wherein the adjustment is configured to remove the clock drift component to reduce the size for the listening window.

17. The BLE device of claim 14, wherein the defined time interval is a defined Inter Frame Space (T_IFS) between packet communications within a connection event with the other BLE device.

18. The BLE device of claim 17, wherein the listening window further comprises a base component configured to account for the defined T_IFS and allowed deviation in the T_IFS.

19. The BLE device of claim 14, wherein the defined time interval is a connection interval between connection events with respect to the other BLE device.

20. The BLE device of claim 19, wherein the listening window further comprises a base component configured to account for the defined connection interval and allowed deviation in the connection interval.

21. The BLE device of claim 14, wherein the one or more processors are further configured to determine a plurality of time differences for a plurality of received packets and then adjust the listening window based upon the plurality of time differences.

22. The BLE device of claim 21, wherein the one or more processors are further configured to generate an average for the plurality of time differences and use the average to adjust the listening window.

23. The BLE device of claim 21, wherein the adjustment is configured to reduce a size for the listening window based upon the plurality of time differences.

24. The BLE device of claim 14, wherein the one or more processors are further configured to determine a distance to the other BLE device and adjust the listening window based upon the distance.

25. The BLE device of claim 24, wherein the one or more processors is further configured to determine that the distance exceeds a predetermine threshold before adjustments are made to the listening window based upon the distance.

26. The BLE device of claim 24, wherein the one or more processors are further configured to determine the distance to the other BLE device using the time difference.

* * * * *